(12) United States Patent
Fidrych

(10) Patent No.: US 9,179,648 B1
(45) Date of Patent: *Nov. 10, 2015

(54) COMBINATION PET COLLAR OR STRAP AND BOTTLE OPENER

(71) Applicant: Paul Fidrych, Portland, OR (US)

(72) Inventor: Paul Fidrych, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,375

(22) Filed: Oct. 27, 2014

Related U.S. Application Data

(63) Continuation of application No. 12/648,240, filed on Dec. 28, 2009, now Pat. No. 8,869,654.

(51) Int. Cl.
- *B67B 7/44* (2006.01)
- *A01K 27/00* (2006.01)
- *B67B 7/16* (2006.01)

(52) U.S. Cl.
CPC ............... *A01K 27/001* (2013.01); *B67B 7/16* (2013.01)

(58) Field of Classification Search
USPC .................................. 81/3.07, 3.09; 119/863
See application file for complete search history.

(56) References Cited

U.S. PATENT DOCUMENTS

| | | | |
|---|---|---|---|
| D46,861 S | 1/1915 | Christi | |
| 1,849,258 A | 3/1932 | Washburn | |
| 1,853,889 A | 4/1932 | Alterson | |
| 1,876,477 A | 9/1932 | Troendly | |
| 1,988,890 A | 1/1935 | Fenton | |
| 1,999,167 A | 4/1935 | White | |
| 2,470,606 A * | 5/1949 | Dennison | 81/3.55 |
| 3,137,907 A | 6/1964 | Unai | |
| 3,393,433 A | 7/1968 | Barcus | |
| 3,576,056 A | 4/1971 | Barcus | |
| 3,760,464 A | 9/1973 | Higuchi | |
| 3,775,813 A | 12/1973 | Higuchi | |
| 4,135,267 A | 1/1979 | McKinney, Sr. et al. | |
| 4,321,891 A | 3/1982 | Moeller | |
| D266,479 S | 10/1982 | Hayakawa | |
| 4,414,865 A | 11/1983 | Brooks et al. | |
| 4,967,622 A | 11/1990 | Phillips | |
| 4,979,407 A | 12/1990 | Hernandez et al. | |
| 5,123,147 A | 6/1992 | Blair | |
| 5,247,905 A | 9/1993 | Arakawa | |

(Continued)

OTHER PUBLICATIONS

Kurgo Wander Collar web-site, Dec. 10, 2009, www.kurgo.com/products/wcol.html, Author Unknown.

(Continued)

*Primary Examiner* — Lee D Wilson
*Assistant Examiner* — Shantese McDonald
(74) *Attorney, Agent, or Firm* — Wolff Law Offices, PLLC; Kevin Alan Wolff

(57) ABSTRACT

A combination dog collar and bottle opener device includes a two-ply strap and combination D-ring and bottle opener. The strap includes a first ply of rubber, preferably recycled from an inner tube. The second ply is mechanically stitched using an interwoven thread to the first ply. A plastic quick-release coupling device acts as a clasp system for selectively and releasably coupling a strap first end to a strap second end. The combination D-ring and bottle opener comprises a generally flat frame body having a first arm and a second arm, a first linking member connecting the first and second arms at a first end of the frame body and a second linking member at a second end of the frame body. An intermediate linking member arranged generally parallel to the first and second linking members and being located at an intermediate position includes a radius bottle pry and offset grooves.

20 Claims, 6 Drawing Sheets

(56) References Cited

U.S. PATENT DOCUMENTS

| | | | |
|---|---|---|---|
| D363,257 S | 10/1995 | Anscher | |
| 5,467,743 A | 11/1995 | Doose | |
| D365,044 S | 12/1995 | Anscher | |
| 5,474,033 A | 12/1995 | Mitchell, Jr. | |
| 5,785,008 A | 7/1998 | Liu | |
| 5,785,010 A | 7/1998 | Koch | |
| 6,185,772 B1 | 2/2001 | Bates | |
| D471,678 S | 3/2003 | Hanna | |
| 6,530,129 B1 | 3/2003 | Cheng | |
| 6,880,490 B2* | 4/2005 | Hanna | 119/863 |
| D504,984 S | 5/2005 | Jones | |
| D536,280 S | 2/2007 | Wemmer | |
| D542,710 S | 5/2007 | Yoshiguchi | |
| 7,237,292 B1 | 7/2007 | Endres | |
| 7,263,750 B2 | 9/2007 | Keene et al. | |
| D578,933 S | 10/2008 | Brown | |
| D579,819 S * | 11/2008 | Brown | D11/231 |
| D579,820 S | 11/2008 | Brown | |
| D581,830 S | 12/2008 | Slabaugh | |
| D623,030 S * | 9/2010 | Spater | D8/16 |
| 7,904,997 B2 | 3/2011 | Foubert | |
| 8,371,250 B2 | 2/2013 | Konovalov | |
| D682,155 S | 5/2013 | Parsons | |
| 2005/0140331 A1* | 6/2005 | McQuade | 320/101 |
| 2006/0102102 A1 | 5/2006 | Bennett et al. | |
| 2007/0034165 A1* | 2/2007 | Yang | 119/863 |
| 2007/0163393 A1* | 7/2007 | Ondeck et al. | 81/3.57 |
| 2008/0173135 A1* | 7/2008 | Beard | 81/3.09 |
| 2011/0154955 A1 | 6/2011 | Fidrych | |

OTHER PUBLICATIONS

BARK4BEER, Facebook Webpage, Nov. 28, 2009, 1 page.
Serena Zanello, "Product Design by Serena Zanello," http://www.coroflot.com/serenazanello/product-design.com, 27 pages.
American Eagle Outfitters web-site pages having unverified dates of Aug. 7, 2007, Jun. 12, 2008, Jan. 15, 2008, Mar. 21, 2008, Apr. 13, 2007 and Jun. 12, 2008, Author Unknown, 6 pages.

* cited by examiner

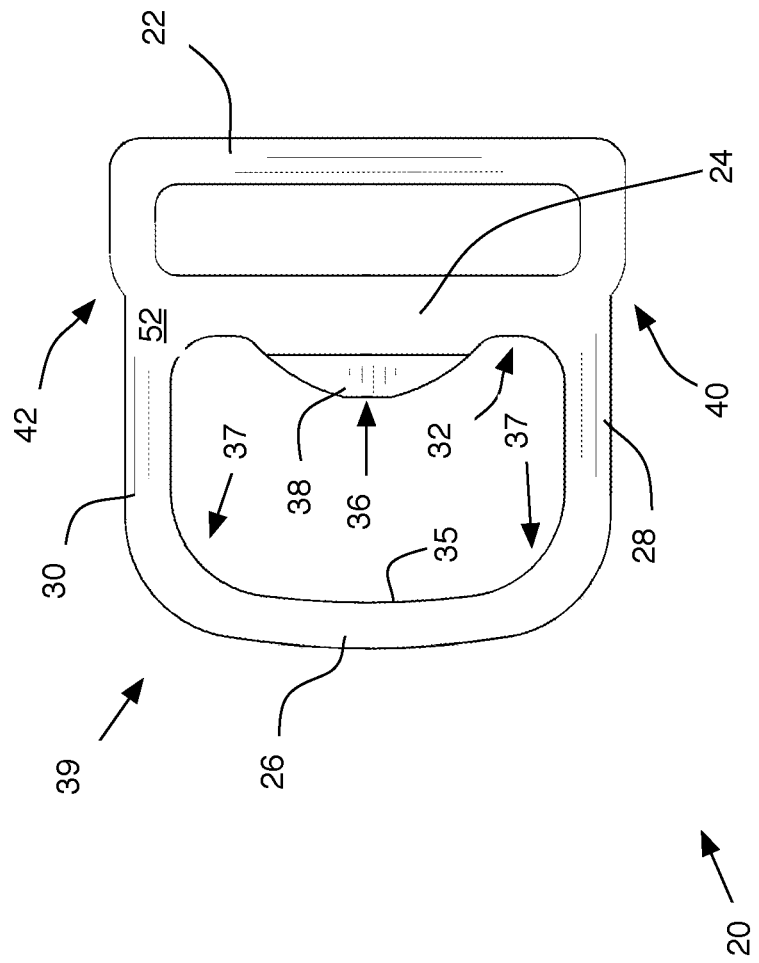

COMBINATION PET COLLAR OR STRAP AND BOTTLE OPENER

This application claims priority to, and is a continuation of, U.S. patent application Ser. No. 12/648,240, filed on Dec. 28, 2009, now to issue shortly as U.S. Pat. No. 8,869,654, and is hereby incorporated by reference for all purposes.

BACKGROUND

This invention relates to the field of collars for small domestic animals and bottle openers and the combination thereof.

Domesticated small animals, such as dogs, often wear collars. Collars serve as both a functional and aesthetic purpose for the owners of the pets. A collar provides a means for connecting a leash to the animal. Often the collar will include a D-ring to facilitate the selective coupling of a leash to the collar. The D-ring also serves as a hanging device for attaching an identification tag.

Far-removed from the art of animal collars, bottle openers were developed to open a variety of bottles, including those with caps that are crimped to seal in the contents, whether it be beer, soda, or other liquids. Openers are available in many different designs, including hand held, wall mounted, vending machine mounted, as well as other styles.

The incorporation of a bottle opener into a device than can be worn on a person is known. For example, U.S. Pat. Nos. 6,185,772 and 4,135,267 describe belt-buckle bottle openers. One attempt to combine a dog collar with a bottle opener is a collar sold under the brand name of Wander Collar by Kurgo available at www.kurgo.com. However, these known devices have several shortcomings: Specifically, the combination belt and bottle opener are generally difficult to use because the bottle-prying feature aligns perpendicular to the long-axis of the belt. Thus, when attempting to open a bottle while worn, the opener causes the belt to twist and this twisting makes opening the bottle difficult or impossible. Further, this twisting is uncomfortable to the wearer. In other devices, the entire belt must be removed for the belt-buckle opener to function as a opener—this is often impractical so such devices are worn as a gag or statement, and fail to work as a utilitarian bottle opener and belt. The Kurgo Wander Collar has many shortcomings in addition to the similar shortcomings just discussed relative to belt-bottle openers: For example, the Wander collar has many sharp crags and edges that can catch on articles and can readily cause injury to the dog or person handling the dog and because of the alignment of the pryhook, it too is difficult to use as an opener when worn as a collar as there is insufficient space to grip the opener when worn on the dog's neck and there is no resistance provided by the collar due to the orientation of the opener relative to the collar.

Yet another problem not contemplated in the art of dog collars and generally overlooked in human apparel is the amount of human-generate scrap material that ends up in land fills and is otherwise wasted and adds to the global greenhouse gas production and increases humankind's carbon footprint. Therefore, there is a need to re-use and/or reclaim any portion of this scrap to reduce the environmental impact new products, including dog collars, cause. One overlooked solution is to re-use discarded rubber products, such as bicycle inner tubes, which are particularly difficult to dispose as they do not quickly degrade or deteriorate, and due to the high petroleum content, pose a serious risk of fire, smoke and air pollution if left in scrap piles. Further, butyl rubber cannot be recycled with other plastics or household waste. The relative low cost of virgin-raw material makes traditional recycling cost prohibitive.

Yet another problem with existing dog collars, which are typically constructed of either leather or nylon, is the time required for the collars to dry after becoming wet. This often causes the material to deteriorate and can become malodorous.

Accordingly, there remains a need for an improved combination of dog collar and bottle opener that improves upon the current art. Such a collar should use recycled material to reduce the environmental impact on the planet. Further, such a device should be operable as a bottle opener when worn without causing distress or pain to the wearer. Also, such a device should be free from sharp edges and crags, but also serves as a means for hanging an identification tag and also serve as a coupling link for a leash. Further, the collar should dry quickly, resist odors, and be soft and comfortable for dogs to wear.

SUMMARY OF THE INVENTION

The present invention overcomes the limitations of the prior art and contemplates a domestic animal collar, specifically a pet dog collar, that includes a combination D-ring and bottle opener. The combination D-ring and bottle opener serves much as a conventional D-ring, enabling a secure means for coupling the collar to a leash and for hanging an I.D. tag, but also serves as a bottle opener without requiring removal of the collar or opener from the pet's neck to use it as a bottle opener. Further, the present invention contemplates a collar consisting of a two-ply material; one ply consists of reclaimed bicycle inner tube rubber, the second ply consists of a hydrophobic material such as nylon or polyester. The combination of a stretchable material (rubber) and a non-stretch material (nylon or polyester) attached with interlocking stitching results in a laminate that has a controlled amount of stretch. The amount of stretch can be varied by changing the length and tension of the interlocking stitch. The use of small, controlled amount of stretch adds a cushioning element to the collar and reduces the force on the dogs neck from a leash. Because the force felt by the animal around the neck is a function of the mass of the collar and leash times the acceleration, a reduction in acceleration due to a stretch or resiliency designed into the collar due to the spacing of the stitching and ply materials results in a corresponding reduction of the force on the dog's neck. This results in a collar that is comfortable for the dog to wear, resists fraying of the edges, is quick-drying, and resists odors. Other features and advantages contemplated include:

An adjuster or slider for adjusting sizing of the collar without creating a loose collar end;

A bottle opener with features to enable simultaneous use as a bottle opener and hold an I.D. tag, and hold a leash clasp, while still being worn around a dog's neck;

The combination D-ring and bottle opener couples to the collar in a way to allow movement parallel with the webbing of the collar;

The dog collar D-ring bottle opener can be used to tie, clasp, or attach a leash to the dog collar in a way that collar/leash attachment point can withstand considerable force;

The smooth rubber surface of the inner ply of the collar will not catch or pull dog's fur; The D-ring/bottle rotate substantially about 180-degrees around the center point of the attachment point on the collar to the bottle pry feature to arrange along the long-axis of the collar so that the collar need not be removed to be operable as a bottle opener; and The D-ring bottle opener includes a formed loop (prying point for the bottle cap) at the center point of the D-ring.

DRAWINGS

FIG. 8 is a top view of an alternative combination D-ring and bottle opener according to a second preferred embodiment of the present invention.

DESCRIPTION OF THE INVENTION

Possible preferred embodiments will now be described with reference to the drawings and those skilled in the art will understand that alternative configurations and combinations of components may be substituted without subtracting from the invention. Also, in some figures certain components are omitted to more clearly illustrate the invention.

Figure 1:
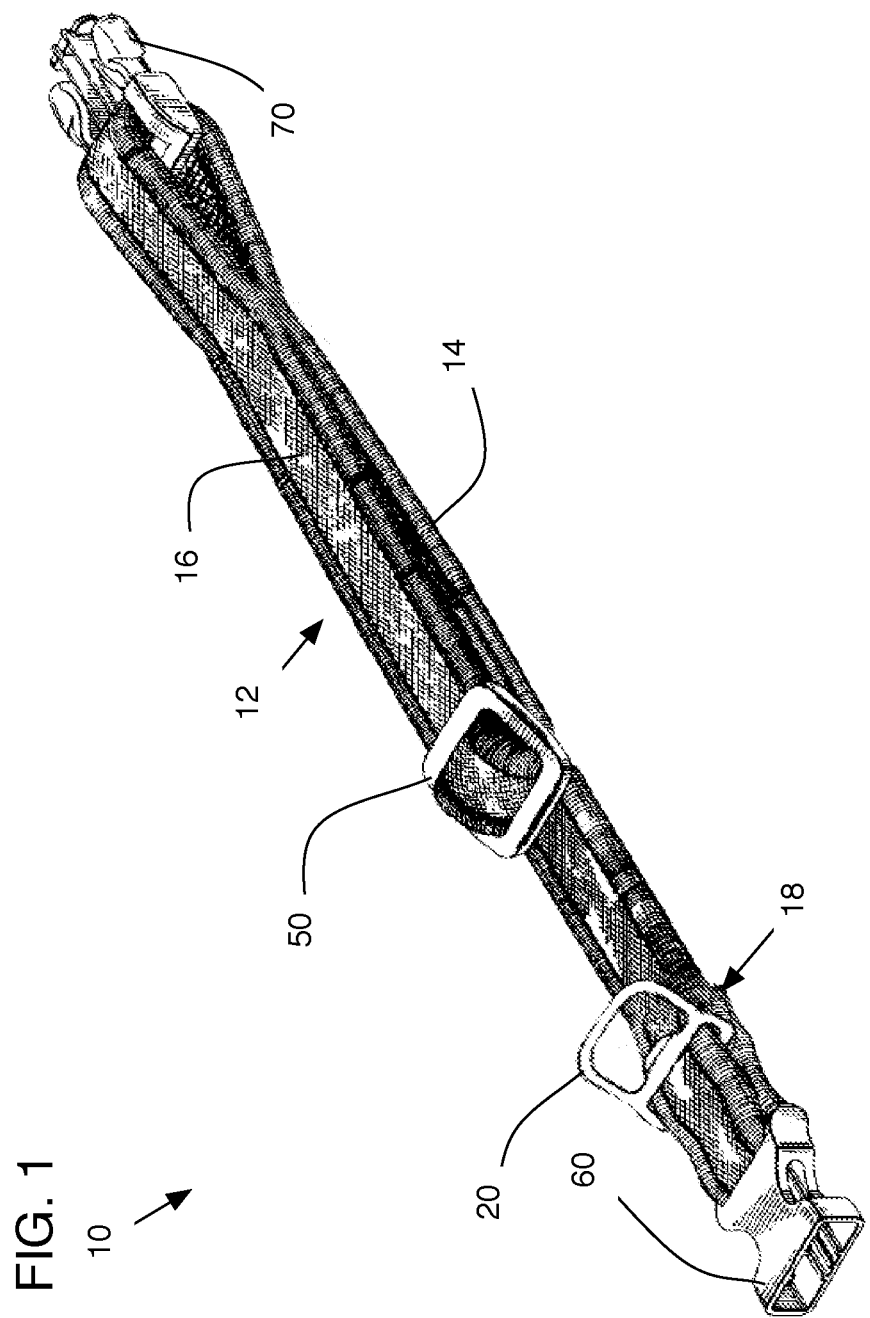
FIG. 1 is an offset top view of a first preferred embodiment according to the present invention.

A first preferred embodiment of the present invention, as FIG. 1 illustrates, contemplates a combination collar and bottle opener device 10 for a small domestic animal, such as a pet dog, comprising a strap 12 with an industry standard plastic quick-connect coupling clasp system. The clasp system includes a female receptacle 60 adjacent to a strap first end 18 whereby a portion of the first end loops through a supporting member, provided by the female clasp end for this purpose, and doubles over itself and is coupled by known means, such as mechanical fastening by a thread interwoven between the overturned flap end, as would be commonly understood in this art. Also adjacent to this first end 18 is a combination D-ring and bottle opener 20.

The strap 12 further includes a strap second end 19 (see, e.g., FIG. 2) coupled to an adjuster 50 (also called a slider). FIG. 3 better illustrates this well-understood adjuster 50 for adjusting the overall length of the collar strap 12. The second end 19 of the strap wraps around an intermediate support 56, which is designed for this purpose, and the end 19 overlaps itself and is mechanically fastened by interwoven thread. An intermediate portion of the strap alternates under the first leg 54, passes over the intermediate support 56 and continues under the second leg 58. Each leg 54 and 58 and intermediate support 56 are generally arranged parallel to each other and supported by a generally rectangular frame body 52.

The device 10 further includes a mating male connector end 70 slideably coupled to the strap at a second intermediate portion. Thus, as the adjuster 50 increases or decreases the overall collar strap length, the male connector 70 moves and rotates relative to the strap portion passing through it. The male connector includes support features to enable this and is well understood in this art. One exemplary clasp system that is well suited to this first preferred embodiment of the present invention includes a clasp by ITW Nexus, of Des Plaines, Ill., USA, as model number C-25, for instance.

Figure 2:
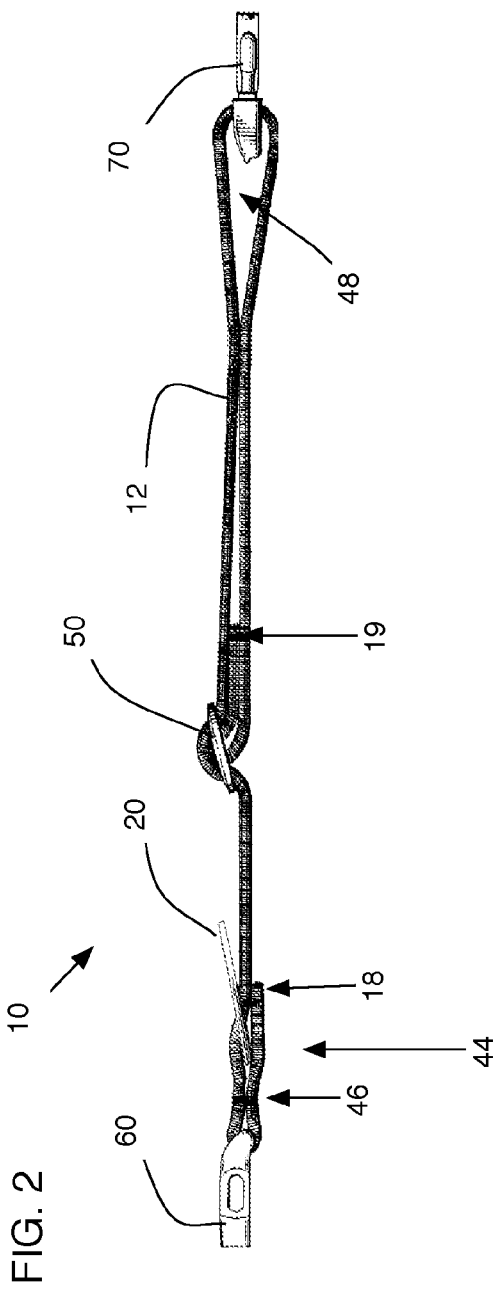
FIG. 2 is a front view of the embodiment of FIG. 1.
Figure 3:
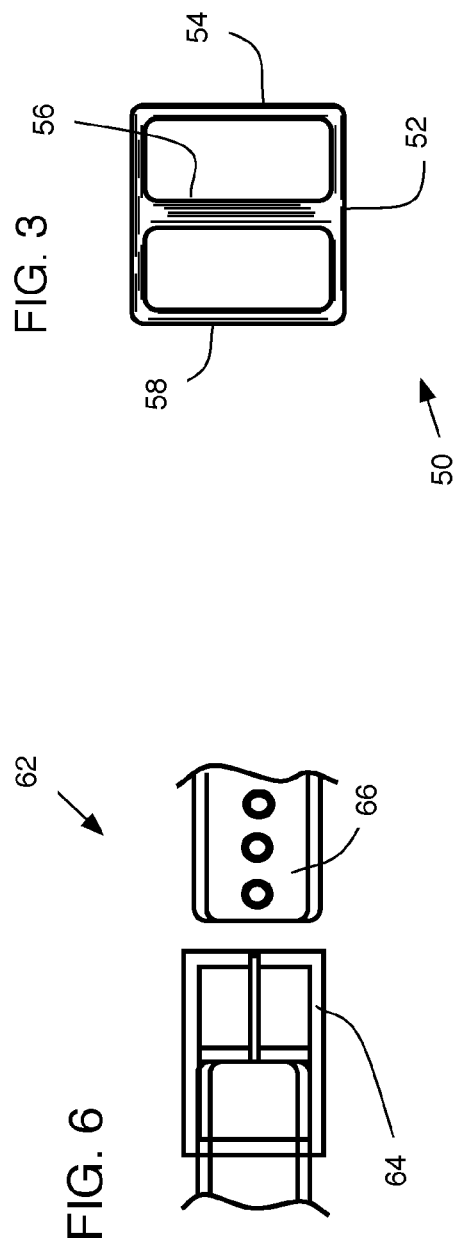
FIG. 3 is a detail top view of an adjuster, a component 5 of the preferred embodiment of the present invention.

FIG. 2 shows a front view of the device 10 according to the first preferred embodiment of the present invention. In this view, the two ply strap 12 includes a female end 60 of a plastic quick-connect coupling mechanism. Immediately adjacent to this portion of the clasp system, the combination D-ring and bottle opener 20 arranges in a slot 44 formed by the overlapped and folded first end 18. The combination ring and opener 20 is prevented from sliding the entire length of the strap by means of a first seam 46 running perpendicular to the long-axis of the strap and a second seam 45 that also captures the proximal end of the first end 18. This seaming feature and slot 44 may be better appreciated in FIG. 5. This slot, importantly, is of sufficient width to allow the combination D-ring and bottle opener 20 to rotate about 180-degrees so it may lie flat coincident with strap in either direction of facing the male end or female end of the strap clasping system. This feature allows the combination D-ring and opener to function as a bottle opener while at the same time being worn by a pet dog. That is to say, that the collar need not be removed from the animal for it to function as a bottle opener. FIG. 2 also shows a region or pocket 48 adjacent to the male quick connect 70. This area enables the male end to pivot and slide relative to the strap, which thereby enables the male coupler to maintain the appropriate orientation relative to the female coupler regardless of the affective length of the collar.

Figure 4:
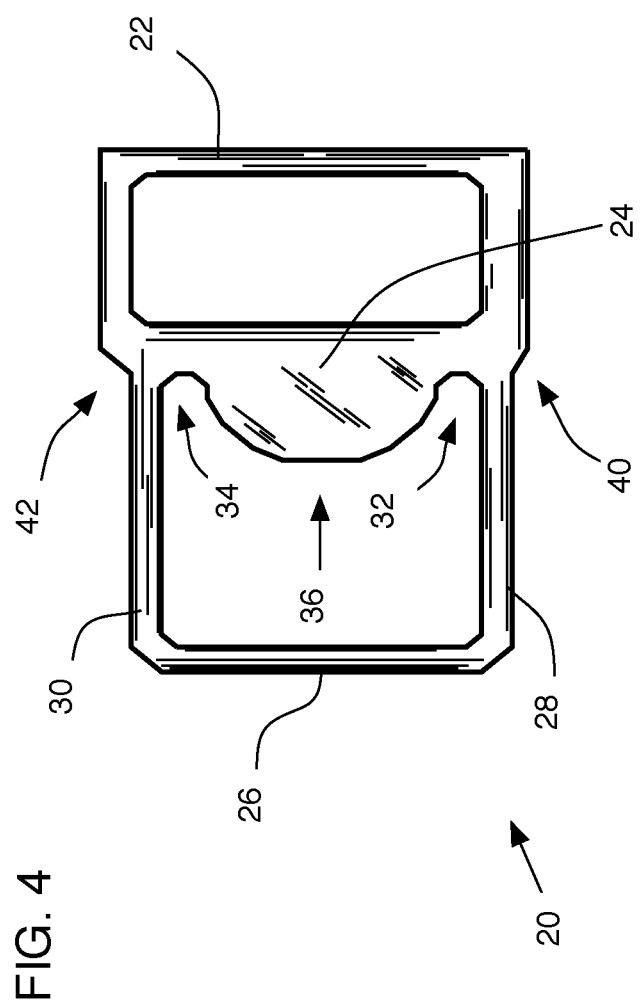
FIG. 4 is a detail top view of a combination D-ring and bottle opener according to the first preferred embodiment of the present invention.

FIG. 4 details the combination D-ring and bottle opener 20 of the first and second preferred embodiments of the present invention. In this top view, the combination D-ring and bottle opener 20 is a flat rectilinear body having a first (upper) arm 30, with intermediate shoulder feature 42, extending horizontally and a second (lower) arm 28 arranged generally parallel to the first arm and also including its own intermediate shoulder feature 40. The arms are separated by three linking members; at the proximal end of the arms a first linking member 22, and at the distal end a second linking member or hinge bar 26, and an intermediate linking member or pry hook 24 midway between the other two links. The first linking member 22 and first upper arm 30 and the intermediate link 24 and the upper arm 28 form a void. This void receives the two-ply strap 12 (as better illustrated in FIG. 5). The intermediate link 26 is of sufficient size to enable a logo or other mark to be affixed thereon for marketing or promotional or other purposes. The corners of the opener 20 are rounded and the edges smoothed to prevent catching fur or cutting tissue. Of particular note, the grooves 32 34 and radiussed pry feature 36 are smooth, arcuate and radiussed edges that flow into each other without any sharp features.

This D-ring and bottle opener 20 further includes a bottle-opening portion consisting of the intermediate link (pry hook) 24 and hinge bar 26. The radius 36 forms a bottle pry for inserting under the lip of a crimped on bottle lid and the second linking member 26 forms the hinge bar that passes over the top of the bottle lid so that a downward rotation of the opener 20 relative to the bottle lid forces the bottle pry region 36 to lift up the overhanging portion of the crimped on lid, while the hinge bar 26 restricts relative movement of the lid, thus forcing it open—as would be well understood in this art. Importantly, the bottle-opening side of the intermediate linking member or pry hook 24 includes a first groove 32 and second groove 24. The importance of these grooves is better understood in relationship to FIG. 5.

Of particular note in this preferred embodiment, the hinge bar 26 and pry hook 24 lie in a common plane and encircle a void suited for clipping a leash; thus, the hinge bar also serves as an attaching point for a leash or collar i.d. tag. Moreover, all three linking members (pry hook 24, hinge bar 26, and first linking member 22) all lie in this first common plane. Because the collar inserts between the intermediate pry hook 24 and the first member 22, there must be sufficient slack in this void to allow the entire combination bottle opener 20 to rotate to lie flat relative to the collar in one direction and rotate 180-degrees to lie relatively flat on the collar in the opposite direction. This results in the combination ring 20 to lie flat on the collar with the long axis of the combination ring 20 coinciding with the long axis of the collar. Further, this orientation of the combination ring 20 results in the long axis of the pry hook 24 being arranged perpendicular to the long axis of the collar. This feature allows the bottle opener portion of the combination 20 to function as a bottle opener without needing to remove the collar from the dog.

A second preferred embodiment of the combination D-ring and bottle opener 20, as FIG. 8 illustrates, includes gentle-rounded corners and smooth curves. The combination D-ring and bottle opener 20 consists of a frame body 52 having an overall thickness of approximately about 2 mm, overall length of about 33 mm, opener/bottle cap area of about 27 mm wide by about 17 mm in length. The prying flange 38 has a length of about 8 mm and an accessory loop 25 detent area 32 about 4 mm. In this preferred embodiment the material is steel. In these preferred embodiments the combination D-ring and bottle opener 20 is fabricated in a stamping operation, then put through a hardening process. Surface finishing is done through hang-up plating with a rust inhibiting coating. Although in this preferred embodiment the opener 20 is coated with a rust inhibiting material, other contemplated embodiment include using aluminum or stainless steel—some dimensions would be understood to be modified to provide the sufficient strength required to prevent the opener 20 from bending when applied to open a bottle. However, in this preferred embodiment, the design has been optimized to create the shortest overall length, as well as shortest standoff height (length that D-Ring stands off of collar), while still allowing operation of opening a bottle. Although the combination opener/D10 ring would work better as a bottle opener in a longer length, this would result in an increased probability that the metal would snag on the dog's fur. And a shorter design, although less-likely to snag, would be inoperable as an opener as the opening force would be impractically high.

The width of arms 30 and 28 are optimized—small enough so that a leash clip can freely rotate around it and slide along it along with the inside radius 37 (which is smaller than the corresponding outside radius 39), yet thick enough to provide a stable platform for bending the bottle cap without causing permanent deflection of member 26. Edge 35 has a very large radius so that it is slightly curved. As a bottle opener, this edge 35 needs to be straight to ensure proper opening of a bottle, but as a clip for a leash it needs to be radiussed to ensure that the leash clip moves to the geometric center of the combination opener/clip 20 when used as a clip to hold a leash. This edge, therefore, needs to cause the leash to move to center, otherwise the leash will cause the opener 20 to twist when worn by the dog and the dog pulls. This can injure the dog.

In the various preferred embodiments, two lockstitches, one on each edge running parallel to each other, holds or couples the first and second ply, which include a top or first ply material such as nylon, hemp, leather, bamboo webbing or other material and the re-claimed rubber (second ply or bottom material). Each lockstitch uses two threads, one passed through the needle and one coming from a bobbin or shuttle. Each thread stays on the same side of the material being sewn, interlacing with the other thread at each needle hole. The optimum thread weight is 92 oz polyester, with a hole spacing of about 4.5 mm.

Figure 5:
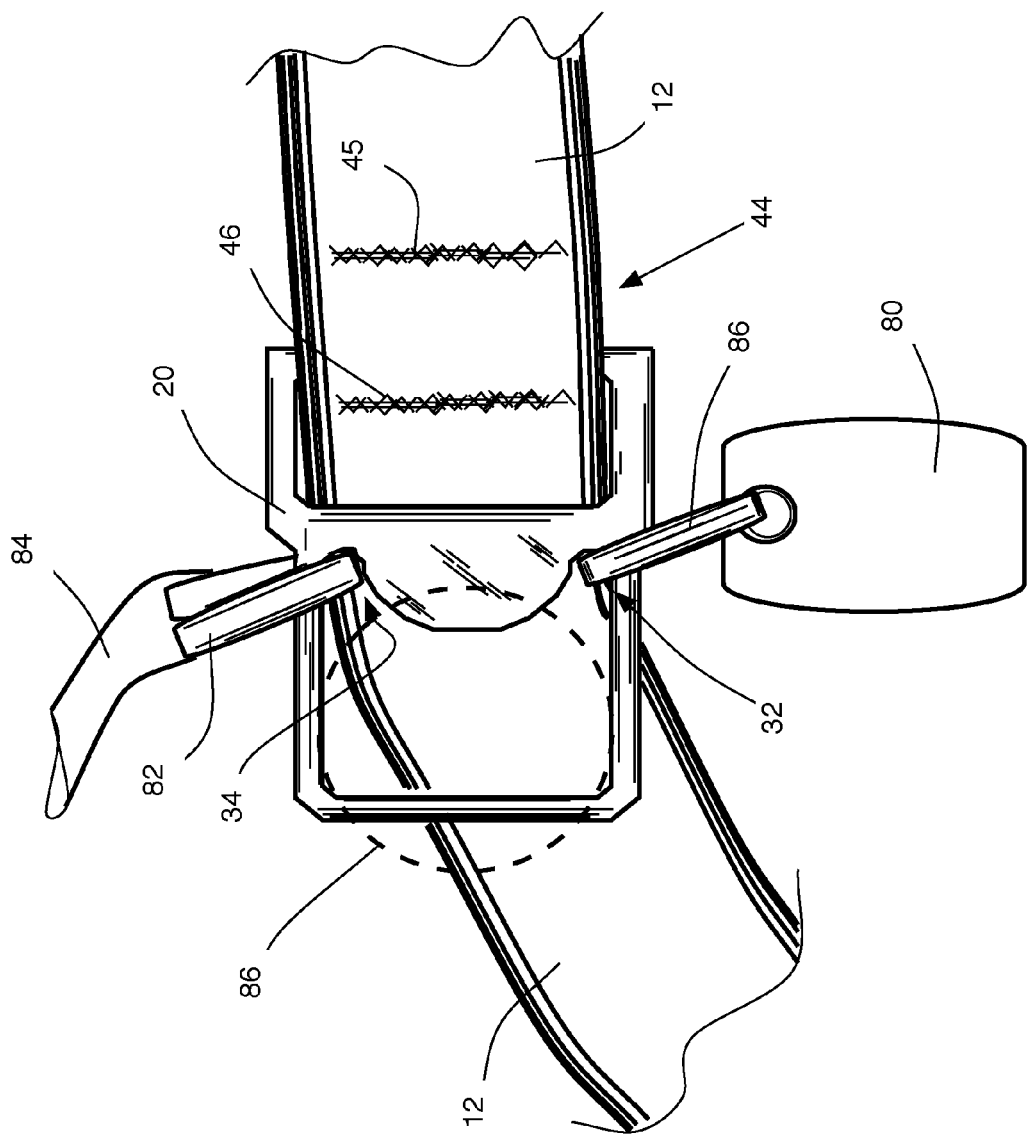
FIG. 5 is a detail top view of the first preferred embodiment highlighting the combination D-ring bottle opener in relation to the strap.

FIG. 5 shows the device of the present invention, a combination dog collar 10 with a combination D-ring and bottle opener 20 having a strap 12 with a specially formed slot 44 adjacent to the first end 18 (not shown in FIG. 5). This slot is formed by two seams stitched perpendicular to the long axis of the strap 12; a first seam 46 and second seam 45. This slot captures the first linking member 22 of the combination D-ring and bottle opener 20 (as better understood in FIG. 4). Grooves 32 and 34 are important because they allow a linking ring 86 (for example, holding an identification tag 80) and a leash clip 82 coupled to a leash 84 to be mounted to the combination D-ring and bottle opener 20 at the same time and simultaneously allow it to function as an opener (a bottle cap is represented by dashed line 86). Further, because the combination D-ring and bottle opener 20 can flip-flop in this slot 44, the opening of a bottle can be accomplished while being worn by a pet. Further the radius pry feature 36 and rounded grooves 32 and 34 ensure that the lease or i.d. tag do not become tangled or caught when used as any conventional D-ring. Further, the rounded corners prevent injury to the animal.

In the various embodiments, the design has been optimized to create the shortest overall length, as well as shortest stand-off height (length that D-Ring stands off of collar) while still allowing operation of opening a bottle. If the length of the frame body is much longer it will make it easier to open a bottle, but the dog may snag it on something, thus being dangerous to the dog. If you make it shorter, opening a bottle will be very difficult or impossible. The void or opening adjacent to member 22 is critical to overall length. Making this opening too short will not allow the opener to swivel 180 degrees perpendicular to the collar; making it to long will result in an overall length that poses danger to the dog.

The prying flange length is critical as well. The human operator uses the prying flange to open bottles. The user would normally place his thumb on top or fingers on the backside of the prying flange. A large plying flange makes opening easier, but increases the overall length of the opener (problems stated above) and/or decreases the opener/bottle cap area (which will make opening more difficult as more force is needed, or impossible as hinge bar would not engage the opener). Just a note that the opener is a lever, so the longer the lever, the less force needed to open the bottle.

Also, an identification tag 80 can be coupled to the combination bottle opener 20 at the first inner loop defined by the void defined by the first linking member 22, the intermediate linking member 24, and the two arms 28 and 30, for example. There is sufficient clearance for both a coupling means 86 and collar strap 12 in this void.

Figure 6:
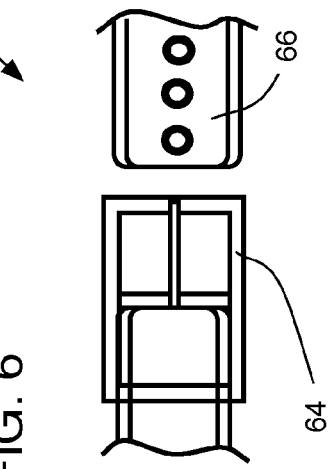
FIG. 6 is a detail top view of a buckle mechanism according to a second preferred embodiment of the present invention.

A second preferred embodiment, as FIG. 6 shows, includes a buckle 62 clasping system comprising a strap first end 18 doubled over a short distance, the overlap is maintained by stitching and the overlap captures a cross bar of the buckle frame 64. A single hole is punched in the two-ply strap 12 to allow the pawl of the buckle to pass therethrough. At an intermediate portion of the strap adjacent to the second end 19 includes at least one hole and grommet for receiving the pawl. Otherwise the construction, use, and operation of this second preferred embodiment mimics the first preferred embodiment.

Figure 7:
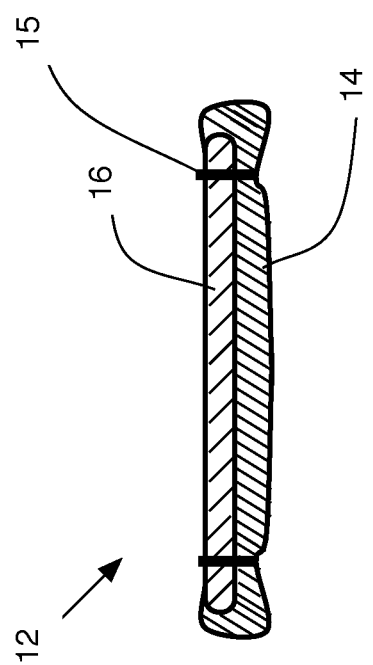
FIG. 7 is a cross-sectional end view of the strap of the various preferred embodiments according to the present invention.

FIG. 7, a cross-sectional end view of a strap 12 according to both the first and second preferred embodiments of the present invention, illustrates a two-ply strap. The strap 12, a strip of flexible material, which may be of any strong, durable, flexible material, most preferably comprises a first ply 14 of a rubber, or rubber like substance. In the preferred embodiments, the first ply 14 comprises an inner tube material recycled from used bicycle inner tubes, which are abundantly available from most bicycle repair shops worldwide. The strap 12 further includes a second ply 16 of any strong, durable, flexible material, but preferably a strong nylon fabric: However, ballistic nylon or leather would be suitable alternatives. The two plies are mechanically fastened together interlocked stitched thread 15, preferably a 92-oz. polyester or nylon material about 0.3 mm in thickness. In other embodiments the two layers may further include a chemical adhesive bond.

Although the preferred embodiments of the present invention disclosed herein discuss utilizing thread interwoven as the means for mechanically fastening overlapping ends of the strap or the two plies of the strap, other well understood mechanical fastening or chemical fastening methods and devices are also contemplated including, for example, riveting, and gluing.

Although the invention has been particularly shown and described with reference to certain embodiments, it will be understood by those skilled in the art that various changes in form and detail may be made without departing from the spirit and scope of the invention.

The invention claimed is:

1. A strap or collar, comprising:
   a strap; and
   a bottle opener coupled to the strap, the bottle opener including a first opening and a second opening adjacent to one another and sharing a first cross member that includes a pry hook protruding on one side of the first cross member into the second opening, the strap being fixedly attached to the bottle opener only through the first opening and not the second opening, the second opening being larger than the first opening and open and bounded by a second cross member opposite the first cross member for cooperating with the pry hook in opening a bottle.

2. The strap or collar according to claim 1, further comprising a buckle coupled to the strap or collar, and wherein the bottle opener first cross member and second cross member couple with two side members to form a D-ring, and the D-ring is securely attached to the strap in an orientation parallel to a main surface of the strap so that a bottle may be opened without twisting the strap when the strap is around a neck of a wearer.

3. The strap or collar according to claim 1, wherein the second cross member is curved.

4. The strap or collar according to claim 1, wherein the bottle opener has one or more grooves adjacent to the pry hook.

5. The strap or collar according to claim 1, wherein the bottle opener first opening and second opening are bounded by a common continuous first side member and a common continuous second side member.

6. The strap or collar according to claim 1, wherein the strap includes recycled material.

7. The strap or collar according to claim 6, wherein the strap includes at least a first ply and a second ply of material coupled to each other, and at least one of the first ply and second play is a material made from a bicycle inner tube or tire material.

8. The strap or collar according to claim 1, wherein the strap includes at least a first ply and a second ply of material coupled to each other, and at least one of the first ply and second play is a material made from a bicycle inner tube or tire rubber type of material.

9. A strap or collar, comprising:
   a strap; and
   a combination leash-to-collar attachment member bottle opener coupled to the strap and having a first smaller opening with the strap threaded through it and a second larger opening including the bottle opener with four sides, one side having a pry hook and an opposite side being curved.

10. The strap or collar according to claim 9, wherein the second larger opening includes a pry hook section with a pry hook for opening a bottle, and the first smaller opening is attached to one end of the strap or collar.

11. The strap or collar according to claim 9, wherein the strap or collar is a pet collar and the leash-to-collar attachment member bottle opener is a D-ring bottle opener.

12. The apparatus according to claim 9, further comprising a buckle attached to the strap or collar, and wherein the strap or collar is for a dog.

13. The apparatus according to claim 9, wherein the strap or collar is made of one or more materials that are recycled and/or waterproof that will not rot or become odorous when exposed intermittently to water.

14. The apparatus according to claim 9, wherein the strap or collar is made of a material that is recycled or not and selected from a group consisting of bicycle inner tube and bicycle rubber tire.

15. A strap or collar, comprising:
   a strap having at least a first portion and a second portion;
   a buckle attached to the first portion of the strap; and
   a combination attachment and bottle opener member coupled to the second portion of the strap through a first smaller opening and a second larger opening being the combination attachment and bottle opener member.

16. The strap or collar according to claim 15, wherein the first smaller opening and the second larger opening share a first cross member with a pry hook protruding into the second larger opening, and the second larger opening includes the first cross member and second cross member coupled with two side members, the first smaller opening having the strap securely attached thereto in an orientation parallel to a main surface of the strap so that a bottle may be opened without twisting the strap when the strap is around a neck of a wearer.

17. The strap or collar according to claim 15, wherein the second larger opening includes a pry hook protruding inward into the second larger opening.

18. The strap or collar according to claim 17, wherein the pry hook is on a flat side of the second larger opening and an opposing side of the second larger opening away from the pry hook is curved.

19. The strap or collar according to claim 18, wherein the opposing side is curved away from the pry hook.

20. The collar according to claim 19, wherein at combination attachment and bottle opener member is a D-ring.

\* \* \* \* \*

UNITED STATES PATENT AND TRADEMARK OFFICE
CERTIFICATE OF CORRECTION

PATENT NO. : 9,179,648 B1
APPLICATION NO. : 14/524375
DATED : November 10, 2015
INVENTOR(S) : Paul Fidrych It is certified that error appears in the above-identified patent and that said Letters Patent is hereby corrected as shown below:

In the claims

Column 8, Claim 7, line 2: "play" should be changed to "ply"

Column 8, Claim 8, line 7: "play" should be changed to "ply"

Signed and Sealed this
Nineteenth Day of July, 2016

Michelle K. Lee
*Director of the United States Patent and Trademark Office*